(12) United States Patent
Abdesselem et al.

(10) Patent No.: US 6,366,157 B1
(45) Date of Patent: Apr. 2, 2002

(54) METHODS AND CIRCUITS FOR DYNAMICALLY ADJUSTING A SUPPLY VOLTAGE AND/OR A FREQUENCY OF A CLOCK SIGNAL IN A DIGITAL CIRCUIT

(75) Inventors: Ouelid Abdesselem, Toulouse (FR); Dejan Mijuskovic, Folsom, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/602,160

(22) Filed: Jun. 22, 2000

Related U.S. Application Data (63) Continuation of application No. 09/230,998, filed as application No. PCT/EP97/04286 on Aug. 6, 1997, now Pat. No. 6,157,247.

(30) Foreign Application Priority Data

Aug. 7, 1996 (FR) ............................................. 96 09952

(51) Int. Cl.[7] ................................................. G05F 3/01
(52) U.S. Cl. ......................... 327/535; 327/538; 327/540
(58) Field of Search ................................. 327/277, 535, 327/538, 540, 158, 161, 149, 150, 276

(56) References Cited

U.S. PATENT DOCUMENTS

| | | | |
|---|---|---|---|
| 4,691,124 A | | 9/1987 | Ledzius et al. ............. 307/303 |
| 4,922,141 A | * | 5/1990 | Lofgren et al. ............. 327/158 |
| 5,428,309 A | * | 6/1995 | Yamauchi et al. ........... 327/158 |
| 5,719,514 A | * | 2/1998 | Sato ............................. 327/262 |
| 5,914,631 A | | 6/1999 | Soneda ........................ 327/535 |
| 6,229,364 B1 | * | 5/2001 | Doetu et al. ................. 327/158 |

FOREIGN PATENT DOCUMENTS

| | | | |
|---|---|---|---|
| EP | 0549052 | 6/1993 | |
| EP | 0632360 | 1/1995 | |
| EP | 0722137 | 7/1996 | |
| JP | 6309315 | 3/1988 | ................. 327/277 |
| WO | 9013079 | 11/1990 | |

OTHER PUBLICATIONS

Patent Abstracts of Japan, vol. 096, No. 009, Sep. 30, 1996 & J P08 136621 A (OKI Electric Ind Co Ltd), May 31, 1996.

* cited by examiner

*Primary Examiner*—Tuan T. Lam
*Assistant Examiner*—Hiep Nguyen
(74) *Attorney, Agent, or Firm*—Mark J. Fink (57) ABSTRACT

A method and circuit (200, 300) for dynamically adjusting the supply voltage (Vdd) in a digital circuit (204, 404) determines the propagation delay (tpd) of a signal along a signal path (222, 310) in the digital circuit and adjusts the supply voltage so that the determined propagation delay equals a predetermined period, such as the clock period of the clock signal (CLK) which clocks the digital circuit. the determined propagation delay equals the predetermined period, the adjusted supply voltage is applied to the digital circuit (204, 404). This technique can be used to optimise power consumption and processing capability.

14 Claims, 3 Drawing Sheets

METHODS AND CIRCUITS FOR DYNAMICALLY ADJUSTING A SUPPLY VOLTAGE AND/OR A FREQUENCY OF A CLOCK SIGNAL IN A DIGITAL CIRCUIT

The application is a continuation of U.S. application Ser. No. 09/230,998, filed on Dec. 12, 1999, now U.S. Pat. No. 6,157,247 which was the National Stage of International Application No. PCT/EP97/04286, filed Aug. 6, 1997.

FIELD OF THE INVENTION

This invention relates to methods and circuits for dynamically adjusting a supply voltage and/or the frequency of a clock signal in a digital circuit wherein the power consumption in and/or processing capability of the digital circuit is optimised.

BACKGROUND OF THE INVENTION

In portable digital devices, such as digital cellular telephones, and any other digital applications which are sensitive to power consumption or power dissipation, such as picocell cellular base stations, reducing power consumption is an important consideration. In portable devices powered by a battery for example, reducing power consumption can extend the period of time in which the portable device is operable, before the battery requires replacing or recharging. Even with non-battery powered devices, there is an advantage in reducing power dissipation in that it can improve reliability of the components of the device.

Digital circuits, which are part of a digital device, such as a digital cellular telephone, require as inputs a supply voltage Vdd and a clock signal. Power consumption (P) in such a digital circuit can be approximated by the following equation:

$$P = c * Fref * Vdd^2$$

where

Fref is the frequency of the clock signal which clocks the digital circuit c is the equivalent capacitance of the digital circuit Vdd is the supply voltage of the digital circuit Thus, from this equation it is clear that by reducing the clock frequency Fref and the supply voltage Vdd, but only to the limit that ensures proper function of the digital circuit, power consumption can be reduced.

A number of different methods for reducing power consumption have already been contemplated. For example, it is known for some applications to run the clock signal as fast as possible when processing is required and then when no processing is required, completely stopping the clock. This method could not be used in applications requiring some processing substantially all of the time. U.S. Pat. No. 5,378,935 discloses a method for optimising power consumption by adjusting the clock frequency of the clock signal according to the need for processing power. Both these methods achieve a linear decrease in power consumption.

Similarly it is also known to achieve a reduction in power consumption by running at a constant lower supply voltage. Since power consumption depends on $Vdd^2$, such a reduction in the supply voltage achieves increased power savings. However, this may result in poorer performance which may be unacceptable in some applications.

Some known systems reduce power consumption by having a power down mode during which the supply voltage is zero. As with those systems which have periods in which the clock is completely stopped, this technique cannot be used in applications requiring some processing substantially all the time.

European Patent Application EP-A-0632360 describes a method for reducing power consumption by adjusting the frequency of the clock signal and the supply voltage according to the task to be performed. Like all the known methods, the method disclosed in this patent application does not take account of variations in circuit parameters with time and from circuit to circuit, due to for example, temperature, ageing and circuit fabrication process.

There is therefore a need for an improved method for dynamically controlling the power consumption in a digital circuit which overcomes the above referenced disadvantages.

SUMMARY OF THE INVENTION

In accordance with a first aspect of the present invention there is provided a method for dynamically adjusting a supply voltage in a digital circuit, the method comprising the steps of:

determining a propagation delay of a signal along a signal path in the digital circuit;

adjusting the level of the supply voltage in dependence on the determined propagation delay until the propagation delay is determined to reach a predetermined period, the supply voltage having a first level when the determined propagation delay reaches the predetermined period; and providing the supply voltage having the first level to components of the digital circuit.

It will be appreciated that by adjusting the level of the supply voltage until the propagation delay reaches a predetermined period, which predetermined period preferably corresponds to the clock period of the clock signal which is clocking the gates of the path, the present invention can determine and use the optimum supply voltage for the path in real time. Thus, power consumption can be optimised in real time taking account of variations in circuit parameters with time and from circuit to circuit, due to for example, temperature, ageing and circuit fabrication process.

In a preferred arrangement, the signal is clocked along the signal path by a clock signal and the determining step comprises the steps of:

providing a duplicate path to the signal path, which duplicate path comprises substantially the same components as the signal path and has an input and an output;

applying the clock signal to the input of the duplicate path;

comparing the phase of the dock signal at the output of the duplicate path with the phase of the clock signal at the input of the duplicate path to provide a phase error signal, the phase error signal being zero when the propagation delay reaches the predetermined period, and wherein the adjusting step comprises the step of adjusting the level of the supply voltage according to the phase error signal.

In accordance with a second embodiment of the first aspect of the invention, there is provided a method for dynamically adjusting a supply voltage in a digital circuit as recited in claim 7 in the following claims.

In accordance with a second aspect of the present invention there is provided a method for dynamically adjusting the frequency of a clock signal and supply voltage in the digital circuit, the method comprising the steps of:

determining a task to be performed by the digital circuit;

adjusting the frequency of the clock signal in dependence on the determined task and supplying the adjusted clock signal to components of the digital circuit;

determining a propagation delay of a signal along a signal path in the digital circuit;

adjusting the level of the supply voltage to provide an adjusted supply voltage in dependence on the adjusted frequency of the clock signal and on the determined propagation delay until the determined propagation delay reaches a predetermined period, the supply voltage having a first level when the determined propagation delay reaches the predetermined period; and providing the supply voltage having the first level to components of the digital circuit.

In accordance with a third aspect of the invention there is provided a method for dynamically adjusting the clock frequency of a clock signal in a digital circuit, the method comprising the steps of:

generating and providing to components of the digital circuit a supply voltage having a predetermined level;

determining a propagation delay of a signal along a signal path in the digital circuit;

adjusting the clock frequency of the clock signal in dependence on the determined propagation delay until the propagation delay is determined to reach a predetermined period, the adjusted clock frequency having a first frequency when the determined propagation delay reaches the predetermined period; and providing a clock signal having the first frequency to components of the digital circuit.

An advantage of this third aspect of the invention is that it enables the processing capability of a digital circuit to be increased according to the given conditions e.g. temperature.

In a preferred arrangement, a supply voltage having a maximum level is provided. When the propagation delay reaches the predetermined period the clock signal is at its maximum frequency for the digital circuit.

BRIEF DESCRIPTION OF THE DRAWINGS

Different aspects and embodiments of the present invention will now be described, by way of example only, with reference to the accompanying drawings in which.

DETAILED DESCRIPTION

Since from the equation above power consumption depends on the square of the supply voltage Vdd, it is desirable to obtain at least the optimum level of supply voltage at any given time.

Figure 1:
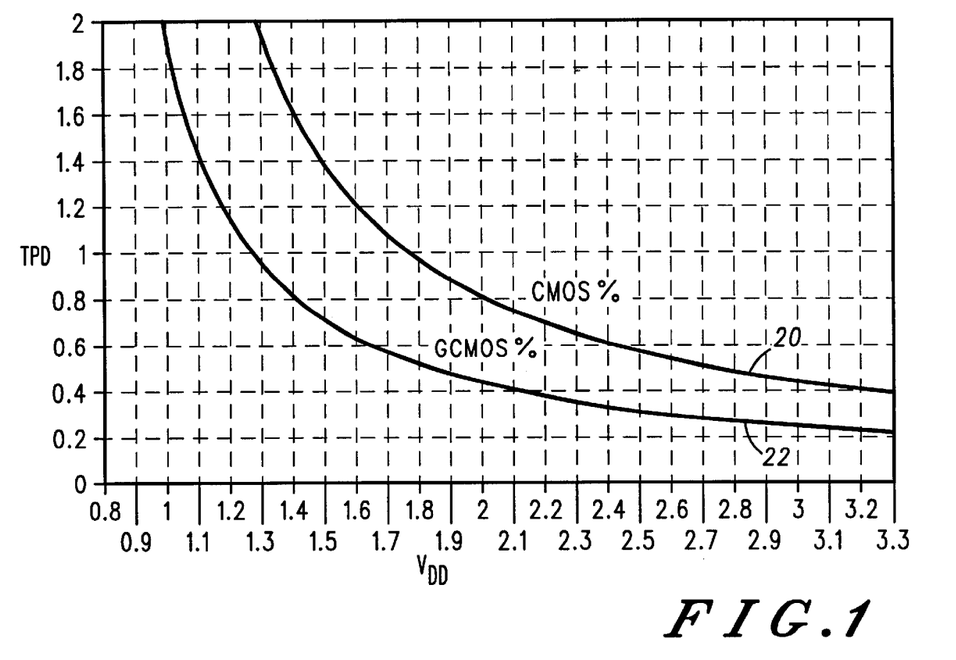
FIG. 1 is a graph of propagation delay (tpd) as a function of supply voltage (Vdd) for two different technologies.

In a digital circuit, a signal clocked along a signal path by a clock signal will be subject to a propagation delay as it is clocked through all the gates of the signal path. The propagation delay is defined herein as the time needed for the propagation of a signal through the gates of a signal path in the digital circuit. There is a relationship between propagation delay and the level of the supply voltage for certain technologies. FIG. 1 is a graph of propagation delay (tpd) as a function of supply voltage (Vdd) and shows two curves 20, 22 for two different 0.5 micron process technologies CMOS and GCMOS respectively. From this graph, it is clear that the propagation delay depends on the supply voltage Vdd supplied to the digital circuit such that as the supply voltage decreases the propagation delay increases.

The method in accordance with the present invention uses the relationship between the propagation delay of a signal along a signal path in a digital circuit and the supply voltage of the digital circuit and dynamically adjusts the supply voltage according to the propagation delay so as, in accordance with one aspect of the invention, to optimise power consumption with respect to the supply voltage. By adjusting the level of the supply voltage until the propagation delay reaches a predetermined period, which predetermined period preferably corresponds to the clock period of the clock signal which is clocking the gates of the path, the present invention can determine and use the optimum supply voltage for the path in real time. In other words, for a given clock frequency, the present invention determines what is the greatest propagation delay, and hence lowest level of supply voltage, which still enables the digital circuit to operate correctly.

It will be appreciated that the supply voltage may be dynamically varied according to propagation delay in accordance with the present invention in a system using a fixed frequency clock signal or in a system which also dynamically varies the frequency of the clock signal. In the latter case, however, the frequency of the clock signal must first be selected and then the supply voltage varied according to the propagation delay and the selected frequency of the clock signal. An example of the latter system are shown in and described with reference to FIG. 5.

In addition to depending on the process technology, the propagation delay depends on temperature and the fabrication process itself. Other parameters may also impact the propagation delay. Thus, when selecting the optimum supply voltage, these parameters must be accounted for. In fact, all these parameters are automatically accounted for by the present invention since the supply voltage and frequency of the clock signal are adapted according to the affect and not cause of such parameters.

Figure 2:
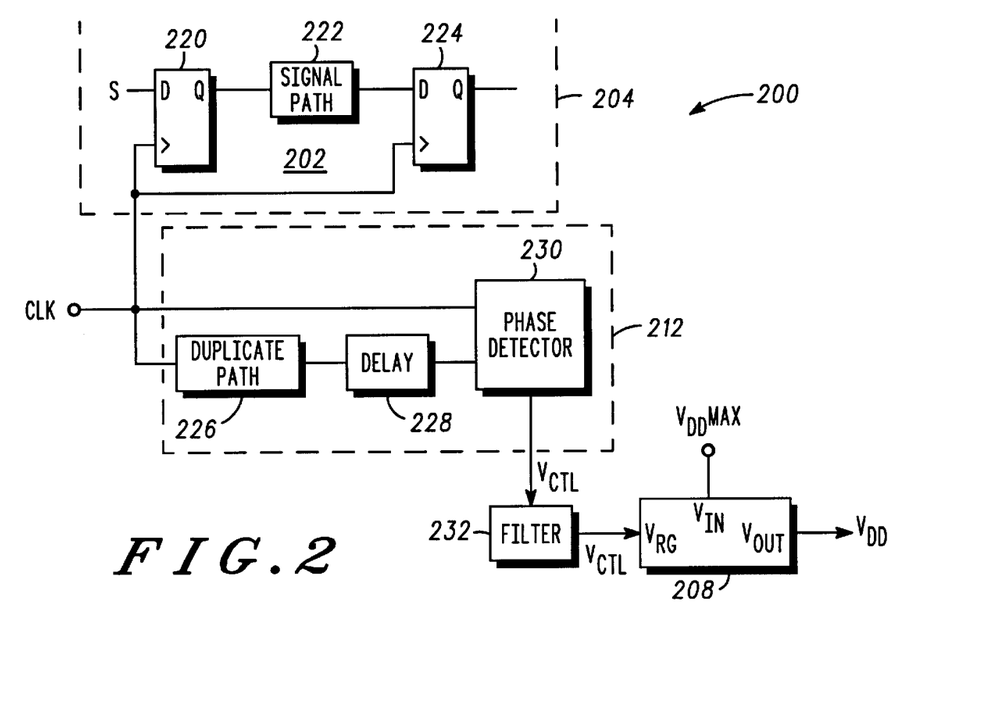
FIG. 2 is a schematic block diagram of a first circuit for dynamically adjusting the level of the supply voltage in a digital circuit.

Referring now also to FIG. 2, a first circuit 200 in accordance with a first embodiment of the invention for dynamically adjusting the supply voltage in a digital circuit 204, only part 202 of which is shown, by monitoring the propagation delay, comprises a voltage level controller 212 and a voltage generator 208.

The part 202 of the digital circuit 204 comprises a signal path 222, comprising a plurality of gates, coupled between first 220 and second 224 flip-flops, both of which are clocked by a clock signal CLK having a clock frequency Fref. A signal S is clocked from the first flip-flop 220 to the second flip-flop 224 by the clock signal CLK and in dependence on the propagation delay of the gates of the signal path 222.

The voltage level controller 212 has an input coupled to receive the clock signal CLK and an output for providing a voltage control signal Vctl to the voltage generator 208. The clock signal CLK at the input of the voltage level controller 212 is coupled directly to a first input of a phase detector 230 and is coupled to a second input of the phase detector 230 via a duplicate path 226. The duplicate path 226 has the same components or gates as the signal path 222. In a preferred embodiment, a predetermined delay 228 is coupled between the duplicate path 226 and the second input of the phase detector 230. Thus, a delayed clock signal with respect to the clock signal CLK is coupled to the second input of the phase detector 230. The phase detector 230 provides the voltage control signal Vctl to the output of the voltage level controller 212. Since the voltage control signal Vctl is a pulse train, in order to avoid jitters in the supply voltage generated by the voltage generator 208, preferably a filter 232 coupled between the output of the voltage level controller 212 and the voltage generator 208 is used to filter the ac components of voltage control signal Vctl.

The voltage generator 208 has a first input coupled to receive the voltage control signal Vctl, a second input for receiving a signal Vddmax, which signal limits the maximum supply voltage generated by the voltage. generator 208 and an output for providing a supply voltage Vdd whose level depends on the voltage control signal Vctl. In a portable device powered by a battery, the signal Vddmax will be equal to the battery voltage. The supply voltage Vdd is provided to all the components of the digital circuit.

Since the duplicate path 226 has the same gates as the signal path 222, the propagation delay through both paths should be substantially the same. The predetermined delay 228 is preferably included as a design margin just in case there is any difference in the propagation delay between the paths 226 and 222. The predetermined delay 228 is also used to provide a margin for the reaction time of some of the components, such as the filter 232 and voltage generator 208, and also to compensate for any remaining jitter after filtering. Thus, even if the paths 226 and 222 are identical, it is preferable to have a predetermined delay 228 so that the supply voltage is slightly higher than required in order to ensure that the propagation delay will always be within the clock period.

The first circuit 200 dynamically adjusts the supply voltage to achieve an optimum level using a delay lock loop arrangement, the operation of which will now be described. In the following, the flip-flops are described as being clocked on the rising edge of the clock signal CLK. It will however be appreciated that they could instead be clocked on the falling edge.

A signal S, clocked from the data input of the first flip-flop 220 to the output Q, should ideally arrive at the second flip-flop 224 by the next rising edge of the clock signal CLK but this depends on the propagation delay of the path 222. The propagation delay of the path 222 is monitored by phase detector 230 using the clock signal CLK and the propagation delay due to the duplicate path 226 and predetermined delay 228 which is arranged to be substantially the same as the delay of the path 222.

The phase detector 230 compares the phase of the clock signal CLK at its first input with that of the delayed clock signal at its second input and provides the voltage control signal Vctl at its output, which signal depends on the comparison between the signals. The voltage control signal Vctl or phase error signal indicates the error between the actual clock signal CLK and the delayed clock signal: that is, the amount by which the propagation delay needs to be adjusted for the given clock signal CLK.

The voltage generator 208 can be implemented by any well known DC/DC voltage converter, such as for example the MC33560 supplied by Motorola, Inc. whose operation is well known in the art and so will not be discussed herein. The voltage generator 208 uses the voltage control signal Vctl or phase error signal to adjust the level of the supply voltage and provide the adjusted supply voltage to all components in the digital circuit including the paths 222, 226. The adjustment to the supply voltage produces a change in the propagation delay of the path 222 and the same change in the propagation delay of the duplicate path 226. The supply voltage is adjusted by the voltage generator 208 so that the propagation delay is adjusted in a direction which results in a reduction in the error between the actual clock signal CLK and the delayed clock signal.

Thus, the voltage control signal Vctl at the output of the phase detector 230 is used to adjust the level of the supply voltage until the error between the two signals at the input of the phase detector 230 is zero. The error is zero when the propagation delay reaches the predetermined time period at which time the supply voltage is at its first level or optimum level for that clock signal CLK. In the first circuit 200 described above, the predetermined period is equal to the period of the clock signal CLK in which case, when a rising edge of the clock signal CLK at the first input of the phase detector 230 arrives at the same time as a rising edge of the delayed signal at the second input, the voltage control signal Vctl or phase error signal is zero.

Preferably, the level of the supply voltage is initially arranged so that it is at a reference level which is greater than the first level or optimum level. This has an advantage in that the digital circuit can at all times function properly. Thus, the level of the supply voltage has to be reduced from the reference level in order to increase the propagation delay of the path 222 and duplicate path 226 to the predetermined period and hence arrive at the optimum supply voltage.

The path 222 is preferably selected to be the most critical path in the digital circuit 204 so as to provide the worse case propagation delay. For this reason, the first circuit 200 and the digital circuit 204 should preferably be integrated on the same chip. For a processor core, the critical path corresponds to a given instruction.

It will be appreciated that the first circuit 200 dynamically adjusts the supply voltage according to the actual propagation delay through the gates of a signal path for a given frequency of the clock signal in real time. This means that the variations in the propagation delay due to for example, temperature, fabrication process, can be accounted for and the optimum level of supply voltage for a given clock frequency can be used at all times.

It will also be appreciated that when the frequency of the clock signal is dynamically adjusted, since the phase detector 230 uses the clock signal itself to adjust the level of the supply voltage and hence the propagation delay, the first circuit 200 can still provide an optimum supply voltage at any given clock frequency.

Figure 3:
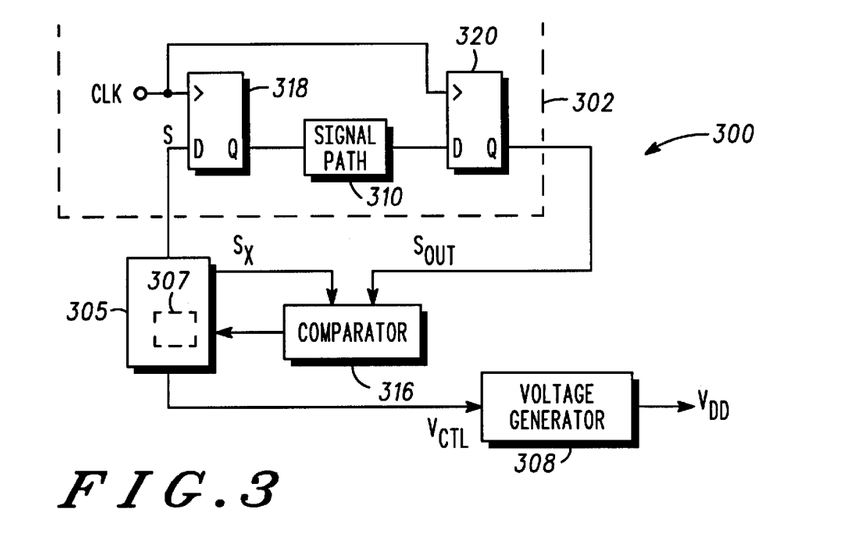
FIG. 3 is a schematic block diagram of a second circuit for dynamically adjusting the level of the supply voltage in a digital circuit.

Referring now to FIG. 3, a second circuit 300 in accordance with a second embodiment of the invention for dynamically adjusting the supply voltage in a digital circuit, only part 302 of which is shown, by monitoring the propagation delay of a signal along a selected path comprises a control unit 305, a comparator 316 and a voltage generator 308. Each task may use different parts of the digital circuit which means that the critical path may vary according to the task to be performed by the digital circuit. In the preferred embodiment, the path 310 is selected according to the task to be performed and is preferably the critical path for the task.

The control unit 305 is coupled to provide an input signal S to the critical path 310 via a first flip-flop 318 and an expected output signal Sx to a first input of a comparator 316. The first flip-flop 318 is clocked by a clock signal CLK which also clocks the gates which are part of the critical path 310 and a second flip-flop 320 coupled to an output of the critical path 310. The output Q of the second gate 320 is coupled to a second input of the comparator 316. An output of the comparator 316 is coupled to an estimator 307 in the control unit 305. The control unit 305 provides a voltage control signal Vctl to the voltage generator 308 which provides at an output a supply voltage Vdd for all the components of the digital circuit, including critical path 310 depending on the voltage control signal Vctl.

Figure 4:
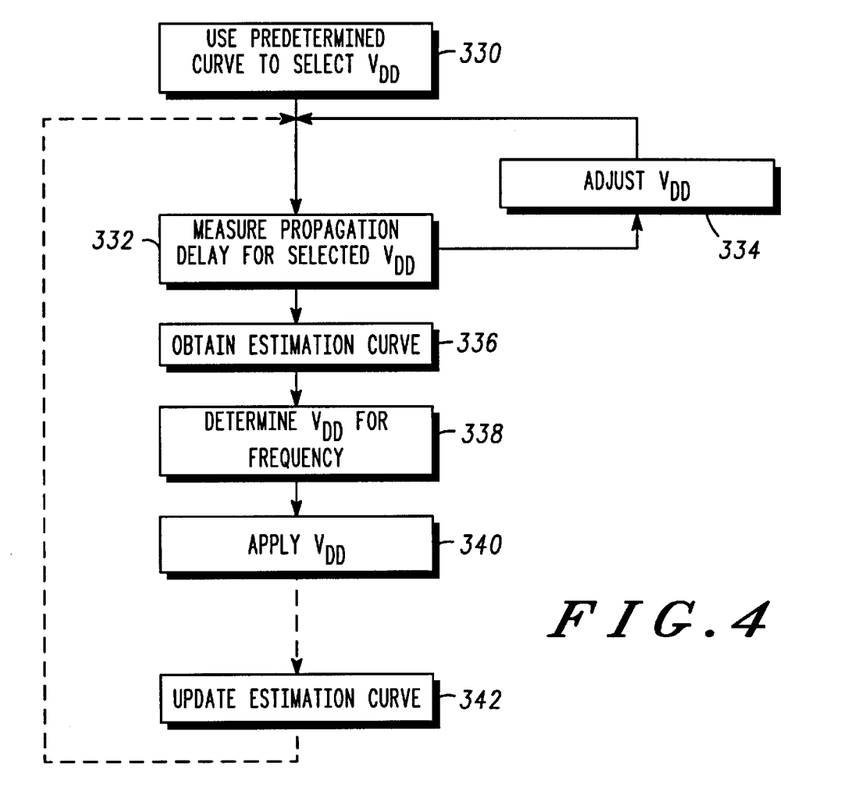
FIG. 4 is a flow chart for a method for adjusting the supply voltage in accordance with the present invention using the second circuit of FIG. 3.

The preferred method by which the second circuit 300 selects a level of the supply voltage Vdd will now be described with reference to FIGS. 1, 3 and FIG. 4, which shows a flow-chart for the preferred method.

In the preferred embodiment, a first sequence of predetermined levels of supply voltage and corresponding propagation delays for a predetermined signal path of the digital circuit are stored in the estimator 307. Preferably, the predetermined path is the worse case path. From the first sequence a predetermined curve, such as that shown in FIG. 1 of propagation delay versus supply voltage, for the worse case path in the digital circuit under the worse conditions (such as temperature) can be generated. A predetermined or default level of the supply voltage Vdd is selected for a given clock frequency from the predetermined curve, block 330, and applied to the gates of the critical path 310.

Next the propagation delay for the predetermined level supply voltage is measured, block 332. The control unit 305 provides an input signal S to the critical path 310 and comparator 316 compares the signal Sout at the output of the critical path with the expected signal Sx. The output of the comparator 316 provides an indication to the estimator 307 in the control unit 305 of the result of the comparison between the signal Sout at the output of the critical path and the expected signal Sx and hence the propagation delay. As described above, for a given clock frequency of the clock signal CLK, the propagation delay of the input signal through the critical path 310 depends on the level supply voltage Vdd. If the signals at the first and second inputs of the comparator 316 match, the output of the comparator 316 is valid. If the signals do not match, an error signal is generated.

The level of the supply voltage is then adjusted from the predetermined level by a predetermined amount and the adjusted supply voltage is applied to the critical path 310, block 334. The steps of providing an input signal, comparing the signal Sout with the expected signal Sx and adjusting the supply voltage is repeated until just before the error signal is generated. In other words for as long as the valid signal is generated. At this point, the propagation delay is determined to have reached a predetermined period or optimum period. The supply voltage has a first level when the propagation delay reaches the predetermined period. The first level of the adjusted supply voltage with its corresponding determined propagation delay are stored. The process is then repeated for each subsequent predetermined level of the first sequence so as to produce a sequence of levels of supply voltage with corresponding determined propagation delays. The second sequence is stored in the estimator 307.

From the second sequence, an estimation of the propagation delay versus supply voltage curve can be obtained. This may require several iterations and/or extrapolations. The estimation propagation delay versus supply voltage curve, unlike the predetermined curve, will take account of variations due to fabrication process, temperature, ageing and also the critical path if this varies with task.

Once the estimation curve has been determined, block 336, it is used to determine the optimum supply voltage Vdd for a given clock frequency, block 338. The optimum supply voltage Vdd is then applied to the critical path 310 and other components in the digital circuit, at block 340. A margin is added to the optimum supply voltage Vdd in order to ensure that the propagation delay of a signal will always be within the clock period.

The estimation curve is periodically updated or refreshed to account for variations due to, for example, changes in temperature, block 342. This means that the variations in the propagation delay due to for example, temperature, can be accounted for and the optimum level of supply voltage for a given clock frequency can be used at all times. When the clock frequency is changed, the appropriate supply voltage Vdd is determined from the estimation curve and applied to the digital circuit via the voltage control signal Vctl and the voltage generator 308.

Thus, the optimum supply voltage Vdd is only applied to the critical path 310 and the rest of the digital circuit once the estimation curve has been generated using the critical path 310. The second circuit 300 therefore operates in two modes: an estimation mode in which the estimation curve is determined; and an operational mode in which a selected value of the supply voltage Vdd is applied to the digital circuit. During the estimation mode, the supply voltage Vdd may not be large enough for correct operation of the critical path 310. However, the estimator 307, the comparator 316 and the other blocks involved in modifying the supply voltage always operate correctly.

When a task changes and a new path becomes a critical path, the estimation process is repeated and the control unit 305 provides the input signal S to the new critical path and the comparator 316 compares the expected signal Sx with the signal Sout at the output of the new critical path.

The second circuit 300 as with the first circuit 200 dynamically adjusts the supply voltage according to the actual propagation delay through a selected path for a given frequency of the clock signal in real time.

All or part of the second circuit 300 may be implemented in software.

It will also be appreciated that when the frequency of the clock signal is dynamically adjusted, since the second circuit 300 uses the clock signal itself to adjust the level of the supply voltage and hence the propagation delay, the second circuit 300 can still provide an optimum supply voltage at any given clock frequency.

The first circuit 200 requires a duplicate path 226 which preferably matches the critical path in the digital circuit irrespective of the task performed by the digital circuit 204. This means that for tasks which do not use gates in the path 226, it may be possible that the supply voltage level could be reduced even more. That is, the first circuit 200 may not achieve the optimum supply voltage level for all the tasks the digital circuit has to perform except in a static way and at the cost of adding more duplicate paths 226. The second circuit 300 in accordance with the present invention addresses this problem by looking at the actual critical path for a current task. A further advantage of the second circuit

300 is that it can be used to optimise power consumption over several integrated circuits. Moreover, since the second circuit 300 does not need to duplicate the gates of the path 222, the second circuit 300 is less expensive than the first circuit 200.

For any digital circuit, the clock frequency Fref is chosen to be as high as possible in order to handle the maximum number of instructions per second (Mips) for a given process technology. Different tasks, however, may require different Mips and hence clock frequency. For example, in a cellular telephone more Mips are required for speech traffic mode compared to a stand-by mode. Since the power consumption of a digital circuit depends on the frequency of the clock signal CLK as well as the square of the supply voltage, it is clear that a circuit which keeps the clock frequency at a maximum all the time, consumes power unnecessarily and improved power consumption can be obtained by varying the clock frequency as well as the supply voltage. A known method, which is mentioned in the introduction above, adjusts the clock frequency according to the task to be performed.

The first 200 and second 300 circuits may both be used in systems wherein the clock frequency is fixed and may also be used in systems wherein the clock frequency is varied.

In accordance with a second aspect of the invention, a system is provided which dynamically adjusts the frequency of the clock signal according to the task to be performed by the digital circuit, and then adjusts the level of the supply voltage according to the adjusted frequency of the clock signal and the determined speed or propagation delay of the digital circuit.

Figure 5:
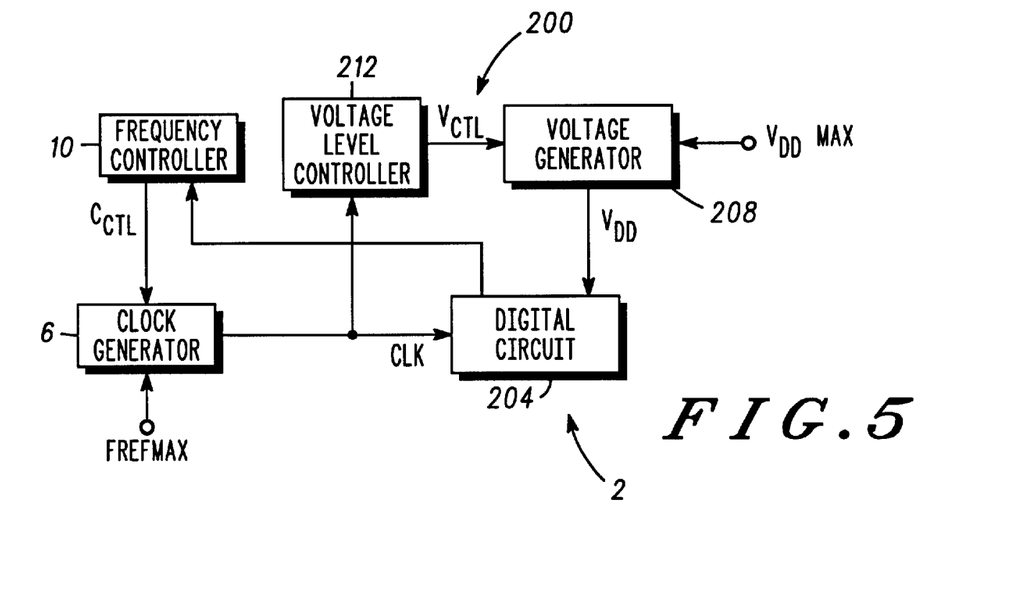
FIG. 5 is a schematic block diagram of a first system for dynamically adjusting the level of the supply voltage and the clock frequency of the clock signal in a digital circuit.

FIG. 5 shows a first system 2 in accordance with a first embodiment of the second aspect of the invention. The system 2 determines the speed or propagation delay in a digital circuit 204 using the first circuit 200 described above. The path 222 is part of the digital circuit 204.

The system 2 comprises a clock frequency generator 6 for supplying a clock signal CLK to the digital circuit 204, and the voltage generator 208 for supplying a supply voltage Vdd to the digital circuit 204. The frequency Fref of the clock signal CLK supplied by the clock frequency generator 6 is controlled by a frequency controller 10. The level of the supply voltage Vdd supplied to the digital circuit 204 is controlled by a voltage level controller 212.

The frequency controller 10 has an input for receiving information concerning the task to be performed by the digital circuit 204 and an output for providing a clock control signal Cctl to the clock frequency generator 6. The frequency Fref of the clock signal CLK depends on the clock control signal Cctl. The clock frequency generator 6 also receives a signal Frefmax which signal limits the maximum frequency generated by the clock frequency generator 6. The signal Frefmax ensures that the frequency of the clock signal CLK does not exceed a value which requires a supply voltage greater than the maximum supply voltage Vddmax.

The voltage level controller 212 has a first input for receiving the clock signal generated by the clock frequency generator 6 and an output for providing a voltage control signal Vctl to the voltage generator 208. Thus, the voltage control signal Vctl and hence the level of the supply voltage Vdd is generated according to the clock signal CLK. The voltage generator 208 also receives a signal Vddmax which signal limits the maximum supply voltage generated by the voltage generator 8 due to, for example, a malfunction.

The first system 2 may be integrated on a single chip or may comprise discrete components.

The first system 2 operates as follows.

The frequency of the clock signal is adjusted according to the task to be performed by the digital circuit 204. The frequency controller 10 uses the information from the digital circuit 204 to determine what task is to be performed and hence what clock frequency such a task requires. The controller may use a look-up table to determine the correct clock frequency for a particular task. The clock control signal Cctl is therefore indicative of the clock frequency for the task to be performed by the digital circuit 204 and the clock frequency generator 6 generates a clock signal having the clock frequency Fref according to the clock control signal Cctl. The clock frequency generator 6 may be implemented by a well known clock frequency divider.

The operation of the frequency controller 10 is highly dependent on the application. For example, in a digital cellular handset, the frequency controller 10 may generate the clock control signal Cctl in dependence only on the state of the processor core which forms the digital circuit 204. Typically the processor core has six states IDLE, FR, HR, EFR, DATA, LP. A look-up table would provide the clock control signal Cctl according to the six states.

The clock control signal Cctl must correspond to a clock frequency the clock frequency generator 6 is able to generate.

Once the frequency of the clock signal has been adjusted to a particular clock frequency, the clock signal CLK at the adjusted frequency is coupled to the voltage level controller 212 and the digital circuit 204. The voltage level controller 212 uses the adjusted clock signal CLK to determine the speed or propagation delay of the digital circuit 204 when clocked by the adjusted clock signal CLK and adjusts the level of the supply voltage according to the adjusted clock CLK and the determined speed. The adjusted supply voltage Vdd generated by the voltage generator 208 is coupled to all the components of the digital circuit 204.

The speed of the digital circuit 204 will be affected by parameters such as temperature, ageing, fabrication process which may cause variations from chip to chip and the process technology itself. The speed of the digital circuit 204 may be determined by looking at the propagation delay of a signal along a signal path in the digital circuit 204. The propagation delay can be monitored by the techniques other than that referred to above with reference to FIGS. 1–3 and the first circuit 200.

Figure 6:
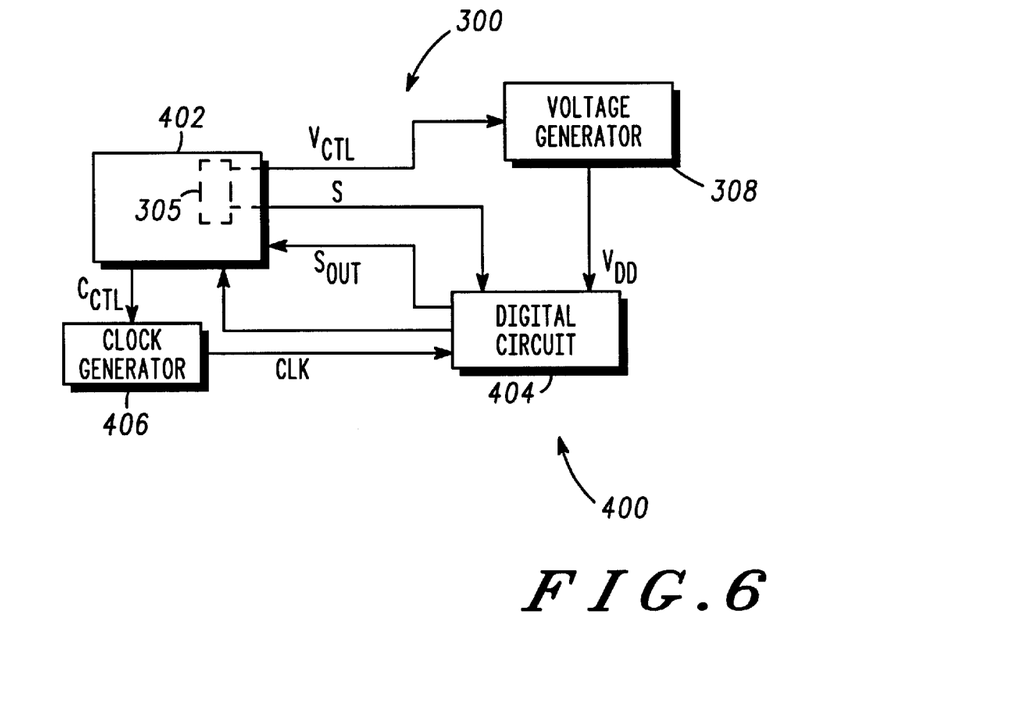
FIG. 6 is a schematic block diagram of a second system for dynamically adjusting the level of the supply voltage and the clock frequency of the clock signal in a digital circuit.

FIG. 6 shows a second system 400 in accordance with a second embodiment of the second aspect of the invention. The second system 400 determines the speed or propagation delay in a digital circuit 404 using the second circuit 300 described above. The control unit 305 and comparator 316 (not shown in FIG. 6) are preferably part of a core processing unit 402. The comparator 316 and estimator 307 may instead be part of the digital circuit 404.

During the estimation mode, the control unit 305 provides an input signal S to a path in the digital circuit 404 and the voltage control signal Vctl to the voltage generator 308 which provides the supply voltage Vdd to the digital circuit 404 as described above. The voltage generator 308 can be implemented by any well known DC/DC voltage converter, such as for example the MC33560 supplied by Motorola, Inc.

The core processing unit 402 has a first input for receiving information concerning the task to be performed by the digital circuit 404, a second input for receiving the signal Sout at the output of a critical path during the estimation mode and an output for providing a clock control signal Cctl to the clock frequency generator 406. The clock frequency generator 406 generates a clock signal CLK at an output which is coupled to the digital circuit 404. The clock frequency generator 406 may be implemented by a well known clock frequency divider.

The second system 400 operates as follows.

The frequency of the clock signal is adjusted according to the task to be performed by the digital circuit 404. The core processing unit 402 uses the information from the digital circuit 404 to determine what task is to be performed and hence what clock frequency such a task requires. From this information, the path which is critical for such a task can be determined. The core processing unit 402 may use a look-up table to determine the correct clock frequency for a particular task. The clock control signal Cctl is therefore indicative of the clock frequency Fref for the task to be performed by the digital circuit 404 and the clock frequency generator 406 provides a clock signal having the clock frequency Fref to the digital circuit 404, including the determined critical path for the task.

Once the frequency of the clock signal has been adjusted to a particular clock frequency, and provided that the critical path has not changed, the optimum supply voltage Vdd for the particular clock frequency can be determined from the determined estimation curve. If the critical path has changed or if the estimation curve requires updating, the control unit 305 provides the input signal S to the determined critical path and the estimator 307 determines the estimation curve according to the comparison between the expected signal Sx and the signal Sout from the output of the critical path. The level of the optimum supply voltage and hence the appropriate voltage control signal Vctl is then determined from the estimation curve using the particular clock frequency Fref.

The voltage generator 308 generates a supply voltage Vdd whose level depends on the voltage control signal Vctl. The adjusted supply voltage Vdd generated by the voltage generator 308 is coupled during the operational mode to all the components of the digital circuit 404.

The digital circuit described above may comprise, for example, a processor core of a digital cellular telephone system or any digital circuit having clock and supply voltage inputs. The digital circuit may be integrated on one integrated circuit or on several integrated circuits.

The first 2 and second 400 systems can therefore select a clock signal having an optimum frequency for a given task and supply voltage having an optimum level according to the clock frequency and speed of the digital circuit. Such systems therefore have improved power consumption. The second system 400 has similar advantages over the first system 2 as those of the second circuit 300 over the first circuit 200 described above.

In the above embodiments, the aim has been to optimise power consumption by varying the supply voltage only according to the determined propagation delay for a given clock frequency or by varying the clock frequency according to a task and then the supply voltage according to the clock frequency and the propagation delay for that clock frequency. However, it may be desirable to adjust first the supply voltage to a certain level and then adjust the clock frequency according to the determined propagation delay so as to provide the optimum clock frequency for that level of supply voltage. This third aspect of the invention may be used to optimise processing capability according to the particularly conditions. In other words, due to the non-linear characteristic of the propagation delay versus supply voltage curve (see FIG. 1), it may be desirable to fix the supply voltage to a certain level so as to obtain an optimum trade-off between power consumption and processing capability.

The third aspect of the present invention provides the means of estimating the maximum clock frequency for different voltage supplies. A supply voltage having a predetermined level is first supplied to the digital circuit and then the clock frequency is adjusted until the clock frequency is such that the propagation delay for a signal path or critical path is determined to reach a predetermined period. At this point, the clock frequency is at the optimum period for the supply voltage. One possible trade-off may be to provide the maximum voltage supply. In which case when the propagation delay reaches the predetermined period, the clock frequency is at the optimum period for the maximum supply voltage and the signal path or critical path and the digital circuit is operating at full Mips capability for the given conditions. Of course, in such a case, the power consumption is not optimised but in the computer field optimised processing capability may outweigh the requirement for optimised power consumption.

The first 200 and second 300 circuits could be modified such that the supply voltage is first set to a selected level and then the clock frequency is modified until the propagation delay reaches a predetermined level. The first circuit 200 requires an additional block (not shown) which determines the level of the supply voltage Vdd and stores values for the propagation delay versus supply voltage curve as in the second circuit 300. Then for both circuits 200 and 300, the linear part of the curve is deduced and from this, the appropriate clock determined and then applied to the digital circuit.

The third aspect of the present invention therefore enables the ideal clock frequency for given field conditions, such as temperature, ageing, fabrication process, to be determined. This may provide distinct advantages in the computer field.

What is claimed is:

1. A method for dynamically adjusting a supply voltage in a digital circuit, the method comprising the steps of:
   determining a propagation delay of a signal along a signal path in the digital circuit, the signal being clocked along the signal path by a clock signal, and the determining step comprising the steps of:
      providing a duplicate path, which duplicate path comprises substantially the same components as the signal path and has an input and an output;
      applying the clock signal to the input of the duplicate path; and
      comparing the phase of the clock signal at the output of the duplicate path with the phase of the clock signal at the input of the duplicate path to provide a phase error signal which is representative of the determined propagation delay,
   adjusting the level of the supply voltage in dependence on the phase error signal until the propagation delay is determined to reach a predetermined amount, the supply voltage having a first level when the determined propagation delay reaches the predetermined amount; and
   providing the supply voltage having the first level to components of the digital circuit.

2. A method according to claim 1 wherein the providing step further comprises adding a predetermined delay in the duplicate path.

3. A method for dynamically adjusting the frequency of a clock signal and supply voltage in the digital circuit, the method comprising the steps of:

determining a task to be performed by the digital circuit;

adjusting the frequency of the clock signal in dependence on the determined task and supplying the adjusted clock signal to components of the digital circuit;

determining a propagation delay of a signal along a signal path in the digital circuit, the signal being clocked along the signal path by a clock signal, and the determining step comprising the steps of:

provide a duplicate path, which duplicate path comprises substantially the same components as the signal path and has an input and an output;

applying the clock signal to the input of the duplicate path; and comparing the phase of the clock signal at the output of the duplicate path with the phase of the clock signal at the input of the duplicate path to provide a phase error signal which is representative of the determined propagation delay, adjusting the level of the supply voltage to provide an adjusted supply voltage in dependence on the adjusted frequency of the clock signal and on the phase error signal until the determined propagation delay reaches a predetermined amount, the supply voltage having a first level when the determined propagation delay reaches the predetermined amount; and providing the supply voltage having the first level to components of the digital circuit.

4. A method according to claim 3 further comprising the step of generating the supply voltage having a reference level which is greater than the first level, wherein the adjusting step comprises the steps of reducing the level of the supply voltage from the reference level in steps to provide an adjusted supply voltage until the propagation delay is determined to reach the predetermined amount and providing the adjusted supply voltage to the signal path of the digital circuit.

5. A method according to claim 3 wherein the providing step further comprises adding a predetermined delay in the duplicate path.

6. A circuit for dynamically adjusting a supply voltage in a digital circuit, the circuit comprising;

a voltage level controller for determining a propagation delay of a signal along a signal path in the digital circuit, the signal being clocked along the signal path by a clock signal and the voltage level controller comprising:

a duplicate path having substantially the same components as the signal path and having an input and an output, clock frequency generator for generating a clock signal for clocking the signal along the signal path, the clock signal being coupled to the input of the duplicate path, and a comparator for comparing the phase of the clock signal at the output of the duplicate path with the phase of the clock signal at the input of the duplicate path and for providing a phase error signal which is representative of the determined propagation delay; and voltage generator for adjusting the level of the supply voltage in dependence on the phase error signal until the propagation delay is determined to reach a predetermined amount, the supply voltage having a first level when the determined propagation delay reaches the predetermined amount and for providing the supply voltage having the first level to the components of the digital circuit.

7. A circuit according to claim 6 further comprising a predetermined delay coupled between the comparator and the output of the duplicate path.

8. A method for adjusting a supply voltage in a circuit, comprising the steps of:

storing a first sequence of the predetermined levels of supply voltage and the corresponding propagation delays for a signal path of the circuit;

providing to the signal path of the circuit a supply voltage having one of the predetermined levels of the stored first sequence;

determining the propagation delay of an input signal along the signal path, wherein the step of determining includes:

providing the input signal to an input of the signal path, the input signal being clocked by a clock signal to an output of the signal path, comparing an output signal from the output of the signal path with an expected signal, generating an error signal when the output signal does not correspond to the expected signal, adjusting the level of the supply voltage from the one predetermined level to another level, and applying the adjusted supply voltage to the signal path.

9. The method of claim 8, wherein the step of adjusting includes adjusting the supply voltage until the error signal is generated, the adjusted supply voltage having a first level when the error signal is generated.

10. The method of claim 8, wherein the step of adjusting includes adjusting the level of the supply voltage until the propagation delay is determined to reach a predetermined amount, the adjusted supply voltage having a first level when the propagation delay reaches the predetermined amount.

11. The method of claim 10, further comprising the step of storing the first level of the adjusted supply voltage with its corresponding determined propagation delay.

12. The method of claim 11, further comprising repeating the providing, determining, and storing steps for each of the subsequent predetermined levels of the stored first sequence of predetermined levels to generate an estimation curve.

13. The method of claim 12, further comprising the step of determining the level of the adjusted supply voltage for a desired propagation delay from the estimation curve and applying the adjusted supply voltage at the determined level to components of the circuit.

14. The method of claim 8, further comprising selecting the signal path in the circuit according to a task to be performed by the circuit.

* * * * *

UNITED STATES PATENT AND TRADEMARK OFFICE
CERTIFICATE OF CORRECTION

PATENT NO.     : 6,366,157 B1
DATED          : April 2, 2002
INVENTOR(S)    : Abdesselem et al.

It is certified that error appears in the above-identified patent and that said Letters Patent is hereby corrected as shown below:

<u>Title page,</u>
Item [*], Notice, delete the phrase "by 0 days" and insert -- by 68 days --

Signed and Sealed this

Twenty-first Day of September, 2004

JON W. DUDAS
*Director of the United States Patent and Trademark Office*